April 9, 1935.  F. FISCHER, JR  1,997,052
SHUTTLE
Filed Sept. 19, 1933
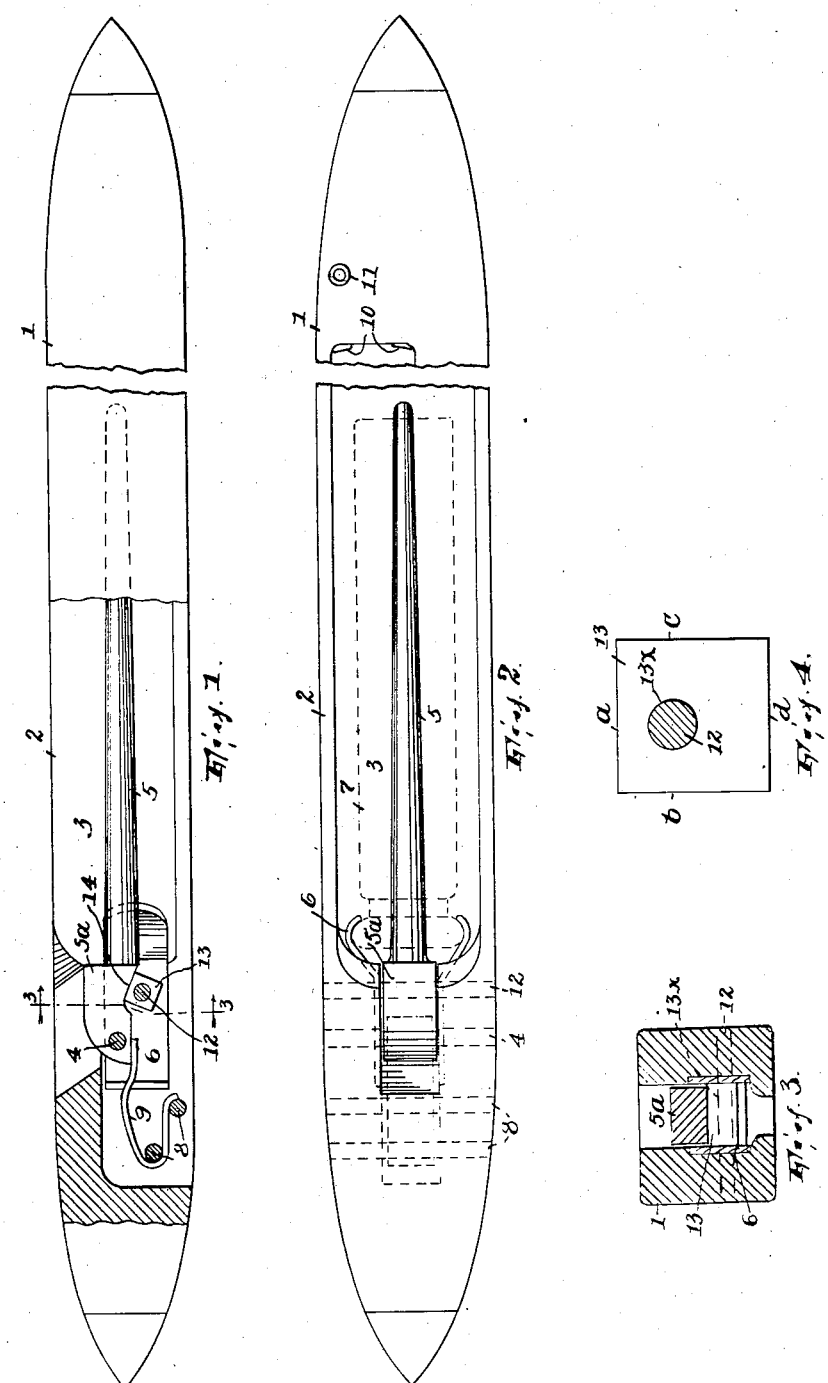
INVENTOR,
Fred Fischer, Jr.
BY
ATTORNEY Patented Apr. 9, 1935

1,997,052

UNITED STATES PATENT OFFICE 1,997,052

SHUTTLE

Fred Fischer, Jr., Paterson, N. J.

Application September 19, 1933, Serial No. 690,068

2 Claims. (Cl. 139—208)

This invention relates to shuttles of the class in which the spindle is pivoted on a transverse axis extending through its butt so that the spindle may be raised from its normal or working position in the shuttle cavity for the purpose of removing the empty cop or quill or other core and replacing it with a freshly wound core. The spindle of such a shuttle is usually held depressed by a strong spring with the butt bearing against a pin forming part of the fixed or body structure of the shuttle and traversing the cavity. From various causes, either incident to the manufacture but more usually to the pressure of the spring, the point or free end of the spindle is or becomes positioned so as not properly to coact with the eyelet by which the filling or thread is led from the cavity, so that the filling fails to run off nicely from the spindle; if this fault arises after the shuttle goes into use it is frequently the result of the mentioned pin becoming bent or arched downward by the spindle and in some degree to the pin being worn by the spindle.

This bending and wear of the pin is due to the spindle, through some fault in its form, actually contacting with the pin at only some more or less local point or place between the sides of the cavity, which it traverses, instead of as to the full extent of the pin between such sides, or at least close to each of them. One object of this invention is to provide for imposing the pressure of the spindle on the pin close to each such side—accomplished by providing on the pin a saddle to receive the pressure of the spindle and which bears on the pin close to each such side.

Another object is to provide for adjusting the elevation of the spindle—accomplished as herein set forth by forming said saddle as a block rotatable in the example on the pin with its periphery presented to the spindle and such periphery formed with circumferentially arranged facets differently distanced from the pin; however, such block may be otherwise rotatable than on the pin.

In the drawing,

Fig. 1 is a side elevation of a shuttle with the portion thereof embodying the invention in section;

Fig. 2 is a plan of the shuttle;

Fig. 3 a section on line 3—3, Fig. 1; and

Fig. 4 shows the mentioned block in side elevation, with the pin on which it is rotatable in section.

The fixed or body structure of the shuttle may be taken as including the body 1 having side walls 2 and the intervening spindle cavity 3, the pin 4 supported at its ends in said walls and on which the butt portion 5a of the spindle is pivoted so that the spindle may be moved to and from housed position in the cavity, in which position it is shown, clips 6 which are penetrated by said pin and inset in walls 2 and have hooked ends to engage the head of and hold from slipping endwise on the spindle the quill 7 when such a core is used for the wound filling mass. At 8 are the usual pins which also have their ends supported in said walls and support the spring 9 whose free end bears against the under side of the spindle butt, tending to hold the spindle depressed. At 10, Fig. 2, are shown the eyelets by one of which the filling leaves the cavity, extending thence to a top outlet eye 11 in the shuttle. Said structure also includes in the example another pin 12 positioned somewhat below and forward of pin 4 and below the butt of the spindle when depressed.

On this pin 12 is arranged a block 13 having a cylindrical bore 13x which snugly fits the (cylindrical) pin from end to end of the block, the block being of such length as snugly to fit between the side faces of the cavity 2—specifically between the inner faces of the clips 6. Thereby the pressure of the spindle, instead of coming locally on the pin at some point between said faces with a tendency to bend the pin downwardly, is imposed on the pin immediately adjacent to the point of support thereof at each end. The saddle, moreover, presents a flat impact face to the spindle, as will appear, instead of a cylindrical surface such as that of the pin, whereby wear caused by the spindle is delayed. The saddle in the best form is further somewhat free to work or shift pivotally, so that if the spindle itself presents a flat surface to the flat surface of the saddle the wear (in fact of the spindle as well as the saddle) is still further delayed.

The block 13 is shown with a polygonal periphery, here square. Its facets $a$, $b$, $c$ and $d$ are so disposed that the facets $b$, $c$ and $d$ are respectively further distanced from the bore 13x than the facets $a$, $b$ and $c$. Thereby the weaver can adjust the elevation of the spindle when in working or depressed position with proper relation to the elevation of that eyelet 10 which is in service. For instance, the spindle being properly related to said eyelet as the shuttle is turned out by the manufacturer and when the spindle rests in contact with facet $a$, if in use the point of the spindle becomes depressed somewhat the block can be turned to present the facet $b$, and so on. The block, as indicated, fits snugly and with some friction between the side faces of the cavity so that it will not freely shift its position when the spindle is raised but yet will shift under the pressure of the spindle to bring the working facet squarely in contact with the opposed face of the spindle which, as will now appear, is flat like each facet.

The spindle butt is provided with an underneath flat face 14 for contact with the block. In the preferred form this face is one side of a notch cut in the under side of the butt and is inclined forwardly and downwardly, the object of which construction is principally to permit the pin 12 being set high enough in the shuttle body to prevent any danger of splitting the latter.

Having thus fully described my invention what I claim is:

1. In combination, with a shuttle body structure having a spindle cavity, a spindle pivoted in said structure on an axis penetrating the side faces of the cavity and movable on its axis to and from housed position in the cavity and a block rotatable in said structure with its periphery presented to the spindle when depressed and having such periphery consisting of a plurality of facets differently distanced from the axis of rotation of the block.

2. In combination, with a shuttle body structure having a spindle cavity, a spindle pivoted in said structure on an axis penetrating the side faces of the cavity and movable on its axis to and from housed position in the cavity, said structure including a pin also penetrating said faces and arranged near said axis, and a block rotatable on said pin and having its periphery presented to the spindle when depressed and such periphery consisting of a plurality of facets differently distanced from the pin.

FRED FISCHER.